(12) United States Patent
Ritz et al.

(10) Patent No.: US 7,877,358 B2
(45) Date of Patent: Jan. 25, 2011

(54) REPLACING SYSTEM HARDWARE

(75) Inventors: Andrew J. Ritz, Sammamish, WA (US); Santosh S. Jodh, Sammamish, WA (US); Ellsworth D. Walker, Seattle, WA (US); Steven A. West, Redmond, WA (US); Michael G. Tricker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 598 days.

(21) Appl. No.: 11/675,272

(22) Filed: Feb. 15, 2007

(65) Prior Publication Data

US 2008/0120518 A1    May 22, 2008

Related U.S. Application Data

(60) Provisional application No. 60/866,821, filed on Nov. 21, 2006, provisional application No. 60/866,817, filed on Nov. 21, 2006, provisional application No. 60/866,815, filed on Nov. 21, 2006.

(51) Int. Cl.
G06F 7/00 (2006.01)
(52) U.S. Cl. ..................................... 707/640
(58) Field of Classification Search ................. 707/205
See application file for complete search history.

(56) References Cited

U.S. PATENT DOCUMENTS

| | | | |
|---|---|---|---|
| 5,345,590 | A | 9/1994 | Ault et al. |
| 5,689,701 | A | 11/1997 | Ault |
| 5,815,731 | A | 9/1998 | Doyle |
| 6,199,179 | B1 | 3/2001 | Kauffman |
| 6,226,734 | B1 | 5/2001 | Kleinsorge |
| 6,247,109 | B1 | 6/2001 | Kleinsorge |
| 6,421,679 | B1 | 7/2002 | Chang |
| 6,502,162 | B2 | 12/2002 | Blumenau |
| 6,546,415 | B1 | 4/2003 | Park |
| 6,574,748 | B1 | 6/2003 | Andress et al. |
| 6,598,174 | B1 * | 7/2003 | Parks et al. ............ 714/6 |

(Continued)

OTHER PUBLICATIONS

Fletcher, M., and D.H. Norrie, "Realtime Reconfiguration Using an IEC 61499 Operating System," Proceedings of the 15th International Parallel & Distributed Processing Symposium, San Francisco, Calif., Apr. 23-27, 2001.

(Continued)

*Primary Examiner*—Tony Mahmoudi
*Assistant Examiner*—Jensen Hu
(74) *Attorney, Agent, or Firm*—Wolf, Greenfield & Sacks, P.C.

(57) ABSTRACT

A method and apparatus for managing spare partition units in a partitionable computing device is disclosed. The method comprises detecting if a spare partition unit is required for addition or replacement in a local operating system and if a spare partition unit is required for addition, initiating an addition of a spare partition unit. If a spare partition unit is required for replacement, a replacement of a failing partition unit with a spare partition unit is initiated; part of the memory of the failing partition unit is passively migrated into the memory of the spare partition unit's partition; part of the memory of the failing partition unit is also actively migrated into the memory of the spare partition unit's partition; and the partitionable computing device is cleaned up. Partition units are replaced without requiring that computer-executable instructions be recompiled.

19 Claims, 11 Drawing Sheets

U.S. PATENT DOCUMENTS

| | | | |
|---|---|---|---|
| 6,640,278 B1 * | 10/2003 | Nolan et al. | 711/6 |
| 6,684,230 B1 | 1/2004 | Momoh | |
| 6,895,586 B1 | 5/2005 | Brasher | |
| 6,907,474 B2 | 6/2005 | Oshins | |
| 6,986,014 B2 | 1/2006 | Qureshi | |
| 7,039,827 B2 | 5/2006 | Meyer et al. | |
| 7,051,243 B2 | 5/2006 | Helgren | |
| 7,065,761 B2 | 6/2006 | Foster et al. | |
| 7,114,064 B2 | 9/2006 | Ramesh | |
| 7,171,590 B2 | 1/2007 | Kadoi | |
| 7,275,180 B2 | 9/2007 | Armstrong et al. | |
| 7,343,515 B1 | 3/2008 | Gilbertson et al. | |
| 7,363,394 B2 | 4/2008 | Shen et al. | |
| 7,480,911 B2 | 1/2009 | Lee et al. | |
| 7,509,375 B2 | 3/2009 | Christian et al. | |
| 7,543,182 B2 | 6/2009 | Branda et al. | |
| 7,562,262 B2 | 7/2009 | Kondajeri et al. | |
| 2002/0016892 A1 | 2/2002 | Zalewski | |
| 2002/0053009 A1 | 5/2002 | Selkirk et al. | |
| 2002/0144193 A1 | 10/2002 | Hicks et al. | |
| 2002/0170039 A1 | 11/2002 | Kovacevic | |
| 2003/0163744 A1 | 8/2003 | Yamazaki | |
| 2004/0107383 A1 | 6/2004 | Bouchier et al. | |
| 2004/0193950 A1 * | 9/2004 | Gagne et al. | 714/6 |
| 2004/0221193 A1 | 11/2004 | Armstrong | |
| 2005/0283641 A1 * | 12/2005 | Clark et al. | 714/4 |
| 2006/0010344 A1 | 1/2006 | Zorek et al. | |
| 2006/0095624 A1 | 5/2006 | Raj et al. | |
| 2007/0061634 A1 | 3/2007 | Marisetty et al. | |
| 2007/0067673 A1 | 3/2007 | Avizienis | |
| 2008/0028413 A1 | 1/2008 | Conklin et al. | |
| 2008/0120486 A1 | 5/2008 | Ritz et al. | |
| 2008/0120515 A1 | 5/2008 | Ritz et al. | |
| 2008/0201603 A1 | 8/2008 | Ritz et al. | |

OTHER PUBLICATIONS

Milojicic, D., et al., "Global Memory Management for a Multi Computer System," Proceedings of the 4th USENIX Windows Symposium, Seattle, Wash., Aug. 3-4, 2000.

Moore, R.W., "Knowledge-Based Grids," Proceedings of the 18th IEEE Symposium on Mass Storage Systems, Apr. 17-20, 2001, San Diego, Calif., 2000, pp. 29-39.

Written Opinion of the International Searching Authority from International Application PCT/US2007/085180, Apr. 21, 2008.

International Search Report from International Application PCT/US2007/085180, Apr. 21, 2008.

Written Opinion of the International Searching Authority from International Application PCT/US2007/085216, Apr. 22, 2008.

International Search Report from International Application PCT/US2007/085216, Apr. 22, 2008.

Written Opinion of the International Searching Authority from International Application PCT/US2007/085184, Mar. 28, 2008.

International Search Report from International Application PCT/US2007/085184, Mar. 28, 2008.

* cited by examiner

REPLACING SYSTEM HARDWARE

CROSS-REFERENCES TO RELATED APPLICATIONS

This application claims the benefit of U.S. Provisional Patent Applications "Transparent Replacement of a System CPU," No. 60/866,821, filed Nov. 21, 2006; and "Driver Model for Replacing Core System Hardware," No. 60/866,817, filed Nov. 21, 2006; and "Replacing System Hardware," No. 60/866,815, filed Nov. 21, 2006; and U.S. Nonprovisional patent applications "Transparent Replacement of A System CPU," Ser. No. 11/675,290, filed concurrently herewith; "Driver Model for Replacing Core System Hardware," Ser. No. 11/675,243, filed concurrently herewith; and "Correlating Hardware Devices Between Local Operating System and Global Management Entity," Ser. No. 11/675,261, filed concurrently herewith, the subject matter of which is also incorporated herein by reference.

BACKGROUND

A microprocessor is an electronic device capable of performing the processing and control functions for computing devices such as desktop computers, laptop computers, server computers, cell phones, laser printers, and so on. Typically, a microprocessor comprises a small plastic or ceramic package that contains and protects a small piece of semiconductor material that includes a complex integrated circuit. Leads connected to the integrated circuit are attached to pins that protrude from the package allowing the integrated circuit to be connected to other electronic devices and circuits. Microprocessors are usually plugged into or otherwise attached to a circuit board containing other electronic devices.

While a microprocessor integrated circuit typically includes only one computing unit, i.e., one processor, it is possible to include multiple processors in a microprocessor integrated circuit. The multiple processors, which are often referred to as "cores," are included in the same piece of semiconductor material and connected to the microprocessor package pins. Having multiple cores increases the computing capability of the microprocessor. For example, a microprocessor with four cores can provide almost the same amount of computing capability as four single-core microprocessors.

There has been an increase in the use of multiple microprocessors and multiple-core microprocessors in traditional computing devices. Traditional computing devices are capable of running only one instance of an operating system. Even traditional computing devices that contain multiple-core microprocessors, multiple microprocessors, or multiple multiple-core microprocessors are only capable of running one instance of an operating system. Still, harnessing the increased computing capability that multiple-core microprocessors provide allows computing functions, that were previously executed by multiple computing devices, to be executed with fewer computing devices.

For example, a server is a computing device connected to a network that provides a service or set of services to other entities connected to the network. A server comprising 32 traditional computing devices, i.e., a 32 way server, may be comprised of eight microprocessors, each having four cores. Taking the concept one step further, if each individual core is eight times more capable than one of the 32 computing devices, the 32-way server's capabilities can be provided by the four core microprocessor. A clear advantage of such a four core server is that computing resource redundancy is more affordable than that provided by traditional servers. In addition, reducing the number of microprocessors reduces the cost of the server, the amount of energy required to power the server, and the amount of maintenance the server requires.

It is possible to use "partitions" to take greater advantage of the computing capabilities of multiple-core microprocessors A partition is an electrically isolatable set of electronic devices, e.g., processors, memory, etc., within a computing device that can run an independent instance of an operating system, i.e., a local operating system. A partitionable computing device is a computing device that can be divided into partitions and thus is able to run multiple local operating systems. A partitionable server is a server that is a partitionable computing device and thus able to run multiple local operating systems. A partition of a partitionable server may also be referred to as a "logical server." That is, to other entities on a network a logical server appears to be a stand-alone server, even though it is not. It also possible to assemble a plurality of servers, logical or otherwise, into a "server cluster." A server cluster is a plurality of servers that behave as a unit to provide a service or set of services.

The advantages of using multiple-core microprocessors is driving a trend toward "server consolidation." Server consolidation is the process of replacing multiple servers, for example in a server cluster, with fewer servers, e.g., one server. A server that replaces multiple servers typically contains computing capability that equals or exceeds the capabilities of the multiple servers. While reducing costs, energy, and maintenance, server consolidation has the effect of putting all of one's eggs into one basket. Server consolidation may increase the impact of a server failure. For example, if multiple applications, which used to run on multiple servers, are all run on the same server, and that server fails, the impact is likely to affect all of the applications. In the worst case, this means application downtime. To guard against such an impact, many high end servers, i.e., servers with a large amount of computing capability, apply a portion of their capabilities to reliability features.

One such reliability feature is "failover" capability. Failover is the ability of a first entity to pass the information the first entity contains onto a second similar entity preferably before the first entity completely fails. Techniques have been developed for traditional servers, i.e., servers based on traditional computing devices, to perform failover in a controlled and orderly fashion to ensure that no data is lost and no ongoing processes are interrupted during the transition from the failing server to the replacement server.

In order to create multiple-core microprocessor servers that are as robust and reliable as traditional servers, similar techniques that operate at the processor level are useful.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and apparatus for managing spare partition units in a partitionable computing device, such as a server, that includes a global management entity and a plurality of local operating systems is disclosed. The method comprises determining if a spare partition unit is required for addition or replacement in the local operating system. If an additional spare partition unit is required, a spare partition unit addition process is initiated. If a replacement spare partition unit is required due, for example, to a partition unit failing a replacement spare partition unit process is initiated. The replacement spare partition unit process causes the spare partition unit to be passively and actively migrated into the failing partition unit's partition and migration actions cleaned up.

In one illustrative implementation, during a spare partition unit addition process, a global management entity selects the spare partition unit to be added from a global device pool; the global management entity initiates the addition of the selected spare partition unit; the local operating system initiates the addition of the selected spare partition unit into a partition in the local operating system, i.e., the local operating system partition; the global management entity brings the selected spare partition unit into the local operating system partition; and when the local operating system discovers the selected spare partition unit in the local operating system partition, the local operating system adds the selected spare partition unit to the local operating system partition.

In one illustrative implementation, during a spare partition unit replacement process, when the local operating system detects a failing device, the global management editing maps the failing device to a physical hardware device; the global management entity selects a replacement device from a global device pool; the global management entity initiates a replacement of the failing device; the local operating system initiates the replacement of the failing device into the local operating system; the global management entity brings the spare partition unit into a partition in the local operating system, i.e., the local operating system partition; and when the local operating system discovers the spare partition unit in the local operating system partition, the local operating system prepares to add the spare partition unit into the local operating system partition.

In one illustrative implementation, during the passive migration of a spare partition unit into a failing partition unit's partition, the local operating system transfers the failing partition's memory using modified flags to track the changed portions of the failing partition's memory; and the global management entity performs an atomic update of the memory controller routing table.

In one illustrative implementation, during the active migration of a spare partition unit into a failing partition unit's partition, the global management entity quiesces the partitionable server; the local operating system transfers the changed portions of the failing partition's memory; the global management entity performs an atomic update of a memory controller routing table; the local operating system transfers the state of the failing partition unit's processor to the spare partition unit's processor; the local operating system changes the system interrupt state of the local operating system; and the local operating system stops the failing partition unit's processor.

In one illustrative implementation, during the clean-up of the partitionable server, the local operating system unquiesces the partitionable server; the local operating system notifies the global management entity of the replacement; and the global management entity removes the failing partition unit's processor both logically and physically.

The global management entity and the local operating systems allow spare partition units to be added or replaced without requiring that computer-executable instructions be recompiled for particular platforms. That is, implementations of the method and apparatus work with an operating system's executable code on a plurality of hardware platforms without modification and recompilation of either the implementation's code or the operating system's code.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
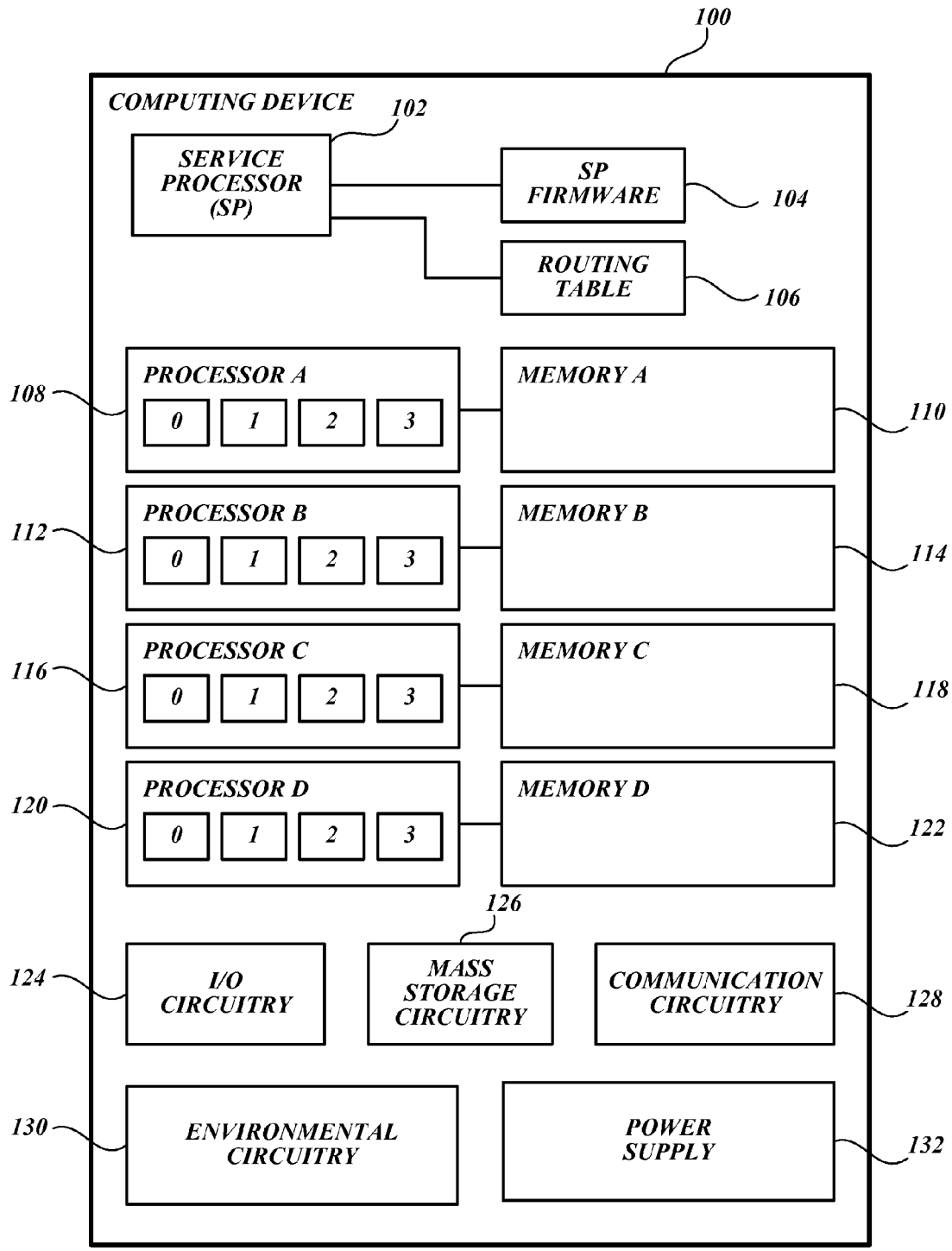
FIG. 1 is a block diagram of an exemplary computing device capable of supporting partition unit replacement.

A server is a computing device connected to a network that provides a service or set of services to other entities, e.g., computing devices, connected to the network. For example, a web page server provides a service that returns web pages in response to web page requests. Other exemplary servers are an email server that returns email messages for particular users, a video server that returns video clips from a video archive, etc. An exemplary server contains a microprocessor, a memory controller, and memory blocks controlled by the memory controller. The memory controller and the memory blocks controlled by the memory controller are often referred to as a unit, i.e., a memory unit. Servers may also contain additional microprocessors, memory controllers, memory blocks, and other electronic devices such as interrupt processors. Hence, servers containing only a microprocessor and memory unit should be construed as exemplary and not limiting.

As with many types of computing devices, the operation of a server is controlled by a software program called an operating system. Traditional computing devices are capable of running only one instance of an operating system. Hence a traditional server, i.e., a server based on a traditional computing device or traditional computing devices, executes the instructions contained in a copy of the operating system, i.e., an instance of the operating system. For example, a server comprising 32 traditional computing devices, i.e., a 32 way server, may be comprised of eight microprocessors, each having four cores and yet run one operating system. Reducing the number of microprocessors reduces the cost of the server, the amount of energy required to power the server, and the amount of maintenance the server requires.

Partitions make it possible to take even greater advantage of the computing capabilities of multiple-core microprocessors A partition is an electrically isolatable set of electronic devices, e.g., processors, memory, etc., within a computing device that can run an independent instance of an operating system, i.e., a local operating system. A partitionable computing device is a computing device that can be divided into partitions and thus is able to run multiple local operating systems. A partitionable server is a server that is a partitionable computing device and thus able to run multiple local operating systems. A partition of a partitionable server may also be referred to as a "logical server." Hence, one partitionable server may contain multiple logical servers. A plurality of servers, logical or otherwise, may be assembled into a "server cluster" that behaves as a unit to provide a service or set of services.

Preferably, partitioning is dynamic. That is, partition units are assigned to, or removed from, partitions with little or no impact on the services the server provides. A server that is capable of being partitioned is a partitionable server. A server system, i.e., system, comprising partitionable servers is a partitionable system. A partitionable system provides flexibility in the number and configuration of partition units and electronic devices assigned to a partition and makes it easier and more cost-effective to support "server consolidation."

Server consolidation is the process of replacing multiple servers with fewer servers or perhaps even only one server. An exemplary server that is the result of a server consolidation typically contains computing capability that equals or exceeds the capabilities of the multiple servers that the server replaces. Server consolidation may increase the impact of a server failure. For example, imagine multiple applications that used to run on the multiple servers are all run on the one server. If the server fails, the impact is likely to affect all of the applications and even cause application downtime.

Traditional servers guard against such an impact by applying a portion of the servers' computing capability to reliability features such as "failover" capability. Techniques have been developed for traditional servers to perform failover in a controlled and orderly fashion to ensure that no data is lost and no ongoing processes are interrupted during the transition from the failing server to the replacement server. Since traditional servers connect to each other through a network and are thus not tightly tied together, work is broken into small pieces and shared across the servers, i.e., packetized. This makes it easy to replace a failing server since the failing server's work packets can be re-routed during failover. Notice that in order to implement failover, there must be more than one traditional server available. That is, a failing traditional server needs another similar traditional server able to accept data from the failing traditional server.

Since a partitionable server may contain multiple logical servers, which can communicate more easily than traditional servers tied together by a network, a partitionable server has the potential to provide reliability more easily and cost-effectively than a group of traditional servers. Processes for controlled and orderly failover that operate using the partitions in a partitionable server help realize the reliability partitionable servers can provide.

It is impractical to make partitionable servers more reliable by notifying each of the high-level software applications when a failover is required. To enable high-level software applications to respond to such a notification would require that the computer code for each application be modified to adapt to the failover. Even notifying applications would probably not be enough to provide failover without a mechanism to replace a portion of a running server. Instead, it is more practical and advantageous to involve only the lowest level software in the failover and allow the upper level software, e.g., applications, to behave as though no hardware change has happened.

An implementation of an orderly, low-level, partitionable server failover involves a global management entity and one or more local operating systems. Examples of a global management entity are a service processor (SP) and a baseboard management controller (BMC). An SP is a specialized microprocessor or microcontroller that manages electronic devices attached to a circuit board or motherboard, such as memory controllers and microprocessors. A BMC is also a specialized microcontroller embedded on a motherboard. In addition to managing electronic devices, a BMC monitors the input from sensors built into a computing system to report on and/or respond to parameters such as temperature, cooling fan speeds, power mode, operating system status, etc. Other electronic devices may fulfill the role of a global management entity. Hence, the use of an SP or BMC as a global management entity should be construed as exemplary and not limiting.

A local operating system is an instance of an operating system that runs on one partition. Partition units are assigned to a specific partition to ensure that the devices in the partition unit cannot be shared with devices in other partitions, ensuring that a failure will be isolated to a single partition. Such a partition unit may indicate which physical addresses are serviced by a given memory controller and, thereby, map the physical memory addresses to the memory controller and to the physical partition unit containing the memory controller. More than one partition unit may be required to boot and operate a partition. Unused or failing partition units may be electrically isolated. Electrically isolating partition units is similar to removing a server from a group of traditional servers with the advantage that partition units may be dynamically reassigned to different partitions.

In the foregoing discussion, unless otherwise noted, a partition unit comprises a single core and a single memory unit. However, partition units may comprise more than one core, memory unit, interrupt processor, and/or other devices that provide computing services and/or support. Hence, the use of partition units comprising a core and a memory controller should be construed as exemplary and not limiting. Managing, e.g., adding or replacing, the partition units in a partitionable server allows a failover to be performed in a controlled and orderly fashion to ensure that the partitionable server is as robust and reliable as traditional servers.

An exemplary computing device 100 for implementing a partitionable server capable of supporting partitions and partition unit addition and/or replacement is illustrated in block diagram form in FIG. 1. The exemplary computing device 100 shown in FIG. 1 comprises a service processor (SP) 102 that is connected to a memory that stores SP firmware 104 and a routing table 106. The computing device 100 also comprises processor A 108 connected to memory block A 110, processor B 112 connected to memory block B 114, processor C 116 connected to memory block C 118, and processor D 120 connected to memory block D 122. Each of the processors 108, 112, 116, and 120 contains four cores designated 0, 1, 2, and 3. The SP 102, which is controlled by the SP firmware 104, uses routing table 106 to manage the isolation boundaries between processors 108, 112, 126, 120 and memory blocks 110, 114, 118, and 122. Computing device 100 also comprises I/O (input/output) circuitry 124, mass storage circuitry 126, communication circuitry 128, environmental circuitry 130, and a power supply 132. The computing device 100 uses the I/O circuitry 124 to communicate with I/O devices. The computing device 100 uses the mass storage circuitry 126 to interact with internally and externally connected mass storage devices. The computing device 100 uses the communication circuitry 128 to communicate with external devices, usually over networks. The computing device 100 uses the environmental circuitry 130 to control environmental devices such as cooling fans, heat sensors, humidity sensors, etc. The power supply 132 powers the computing device 100. If, for example, SP 102 is replaced by a BMC, the BMC may communicate with and control the environmental circuitry 130 and the power supply 132 more precisely.

A computing device such as the exemplary computing device 100 illustrated in FIG. 1 and described above supports the replacement of partition units. An exemplary partition unit may be formed from processor A 108 and memory block A 110 shown in FIG. 1. Such an exemplary partition unit is similar to the partition unit comprising processor A 202 and the memory block connected to processor A 202 shown in FIGS. 2 and 3. Both of the block diagrams shown in FIG. 2 and FIG. 3 include the same four partition units. Each of the partition units comprises a processor and a memory block: processor A 202, connected to memory block 204; processor B 206, connected to memory block 208; processor C 210, connected to memory block 212; and processor D 214, connected to memory block 216.

Figure 2:
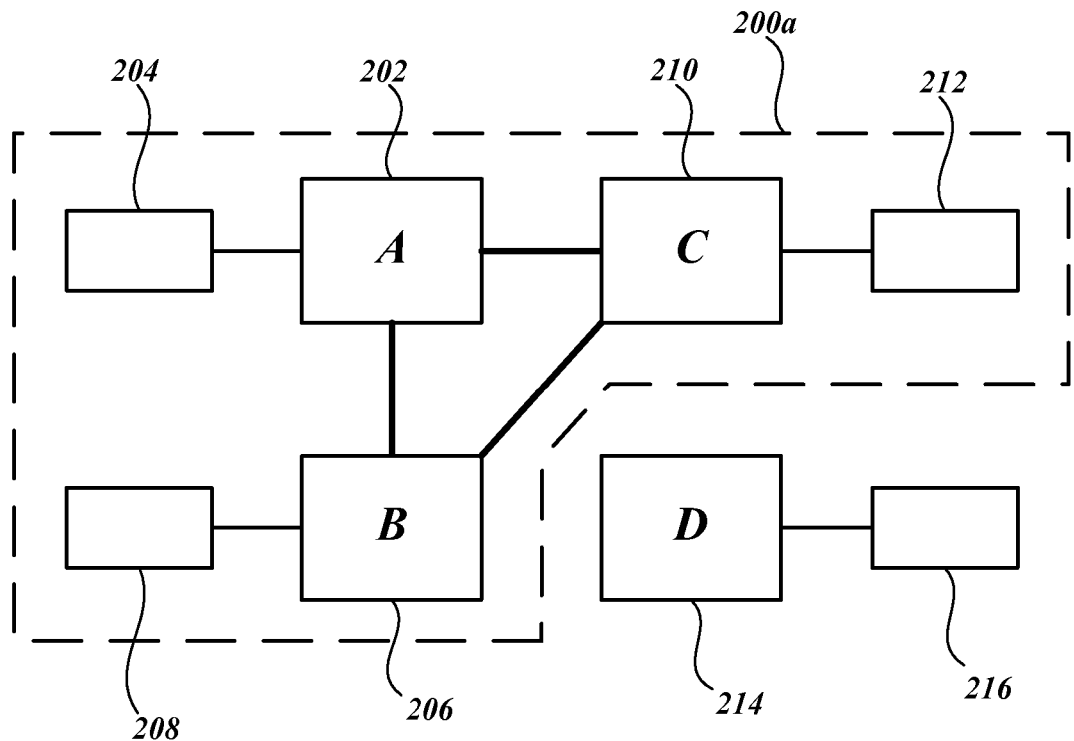
FIG. 2 is a block diagram of an exemplary partition containing a plurality of partition units, one of which is unassociated.
Figure 3:
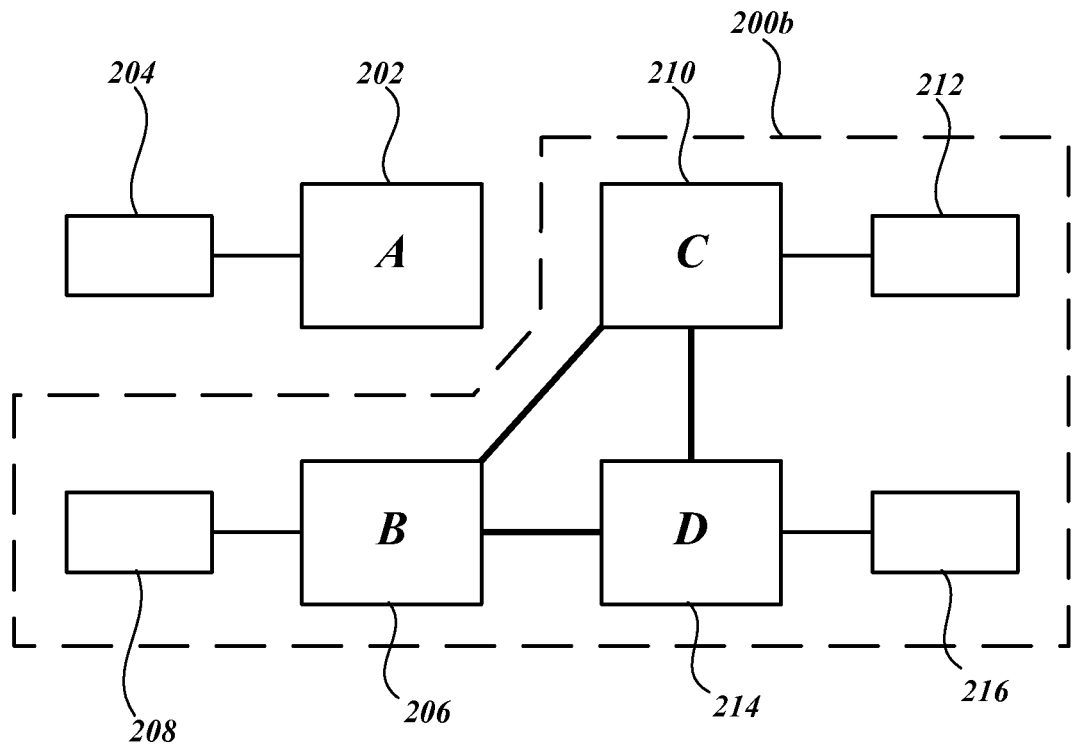
FIG. 3 is a block diagram of the exemplary partition illustrated in FIG. 2 reconfigured to include the previously unassociated partition unit.

The replacement of partition units may be understood by comparing the block diagram shown in FIG. 2 to the block diagram shown in FIG. 3. While the block diagrams in both FIG. 2 and FIG. 3 illustrate the same four partition units, the partition 200a shown in FIG. 2 comprises a different set of partition units when compared to the partition 200b shown in FIG. 3. The partition 200a illustrated in FIG. 2 comprises: processor A 202 and memory block 204; processor B 206 and memory block 208; and processor C 210 and memory block 212. In FIG. 2 the partition unit comprising processor D 214 and memory block 216 is not included in partition 200a. In contrast to the partition 200a shown in FIG. 2, the partition 200b shown in FIG. 3 has been changed to comprise a different set of partition units, i.e., a different set of processors and memory blocks. The partition 200b shown in FIG. 3 comprises: processor B 206 and memory block 208; processor C 210 and memory block 212; and processor D 214 and memory block 216. In FIG. 3, the partition unit comprising processor A 202 and the memory block 204 is not included in the partition 200b, whereas the partition unit comprising processor D 214 and memory block 216 is included in partition 200a, shown in FIG. 2. In effect, the partition unit comprising processor D 214 and memory block 216 replaces the partition unit comprising processor A 202 and memory block 204. The SP 102 changes the routing table 106 to make the replacement. Such a replacement would be desirable if, for example, processor A 202 and/or memory block 204 were failing, or a processor with a larger memory were required.

Figure 4:
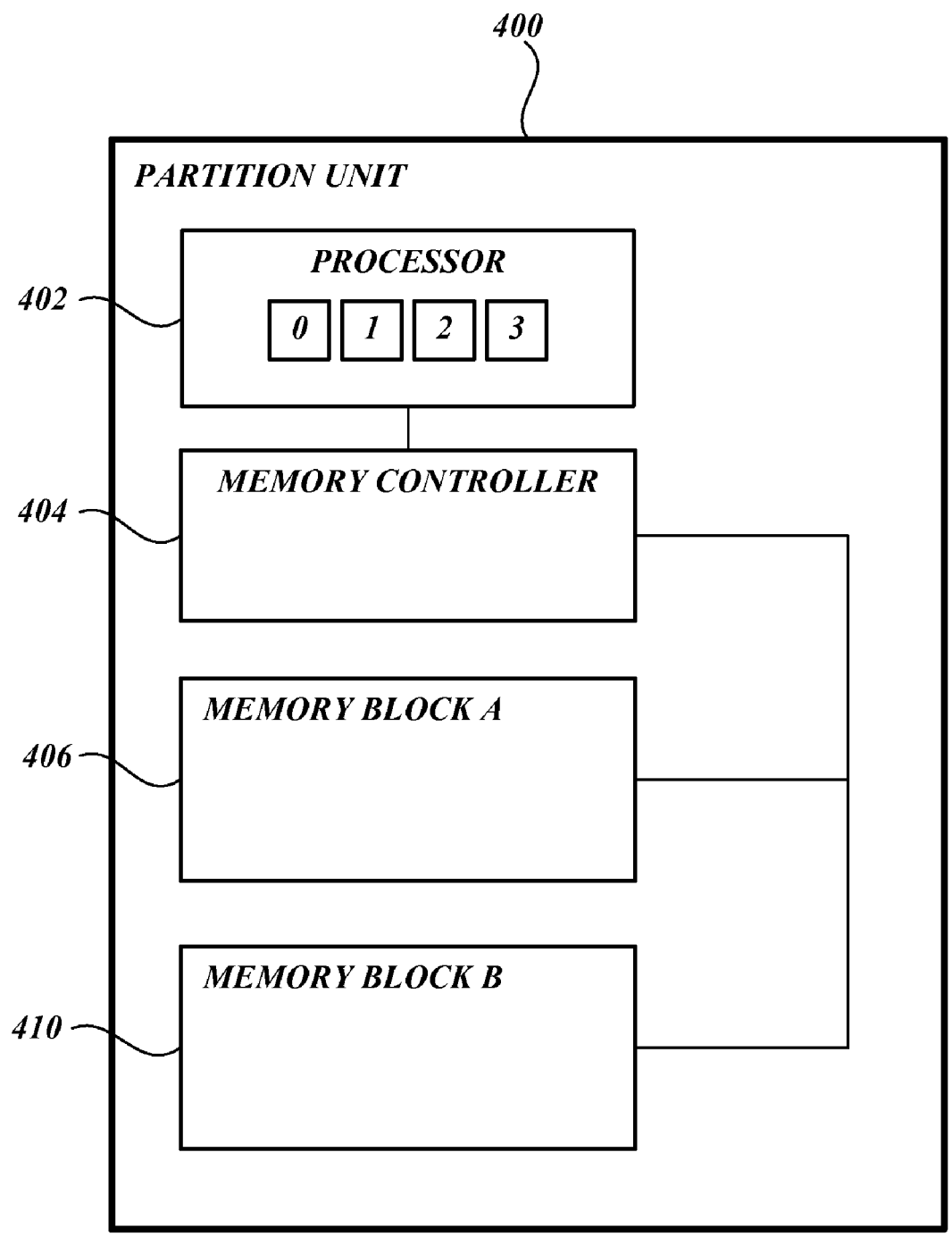
FIG. 4 is a block diagram of an exemplary partition unit.

While a single processor and a single memory block, such as processor A 202 and memory block 204, may comprise a partition unit, a partition unit may have other forms. A detailed view of an exemplary partition unit 400 having a different form is illustrated in FIG. 4. In FIG. 4, as in FIG. 1, the exemplary partition unit 400 comprises a processor 402 containing four cores 0, 1, 2, and 3 connected to a memory controller 404 that is connected to two memory blocks—memory block A 406 and memory block B 410. The processor 402 communicates with the memory controller 404, which controls memory block A 406 and memory block B 410. Other partition units may contain other devices in addition to a processor, memory controller, and memory blocks, or may contain only a single processor or a single memory controller. Hence, the partition unit 400 should be construed as exemplary and not limiting.

A device in a typical partition unit, e.g., a processor, may be capable of notifying the local operating system of the device's status. Alternatively, or in addition, the local operating system controlling the partition unit may use predictive analysis to assess the status of the device and determine if the device might be failing and, thus, may be a candidate for replacement. While a person, such as a system administrator, might check device status as a part of regular maintenance, it is preferable to have the hardware itself notify the local operating system of an impending failure. In some situations, it may be desirable to upgrade a processor from one model to another model or to add processors and/or memory to a system. While a system administrator may perform such functions, it is preferable to automate such replacements and additions by using explicitly programmed instructions or by periodically timed instructions that make use of partitions, partition units, and the ability of hardware to report status.

Figure 5:
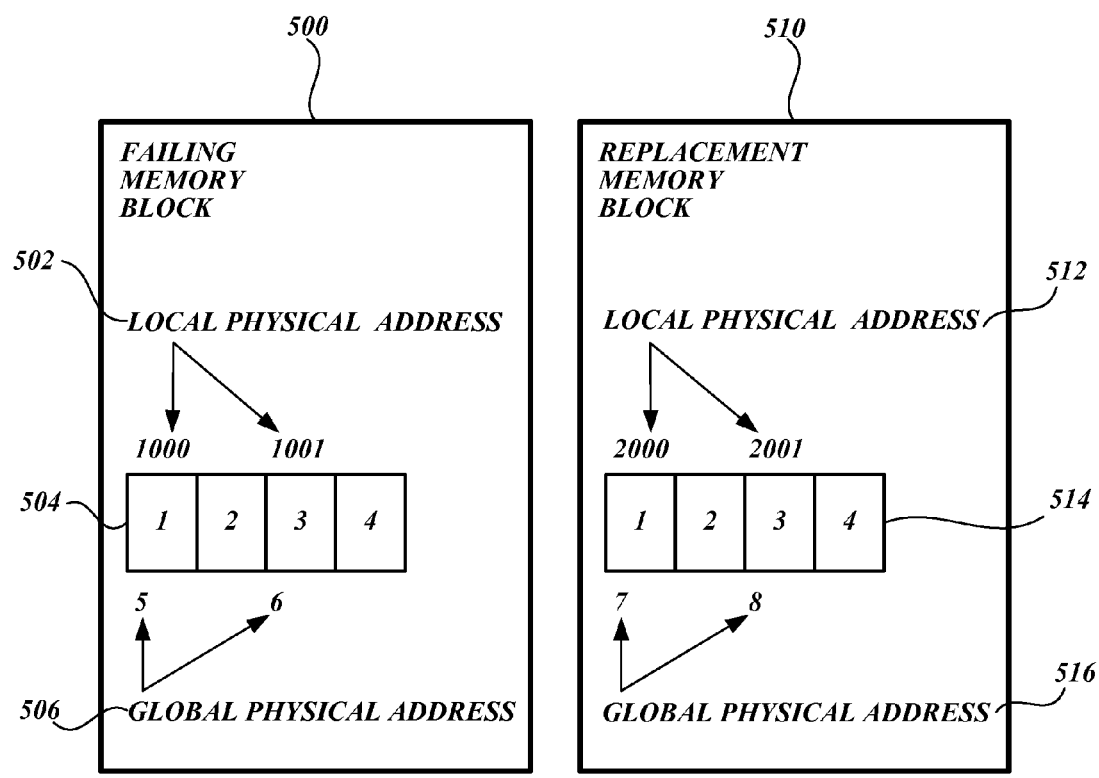
FIG. 5 is a block diagram of an exemplary failing memory block and an exemplary replacement memory block.

Any of the devices, e.g., a memory block, in a partition unit, such as the partition unit 400 illustrated in FIG. 4, may fail. If a memory block fails, it is preferable to replace the memory block with an equivalent memory block. An exemplary failing memory block and an equivalent exemplary replacement memory block are illustrated in FIG. 5. In FIG. 5, a failing memory block 500 comprises a set of memory cells 504 containing data, for example, the numbers 1, 2, 3, and 4. The memory cells in the set of memory cells 504 may be referenced using a local physical address 502 and may also be referenced using a global physical address 506. The local physical address 502 uses addresses 1000 and 1001, whereas the global physical address 506 uses addresses 5 and 6. The failing memory block 500 may be replaced by a replacement memory block 510. The replacement memory block 510 comprises a set of memory cells 514 able to contain the data from the failing memory block 500, i.e., the numbers 1, 2, 3, and 4. As with the failing memory block, the memory cells in the set of memory cells 514 in the replacement memory block 510 may be referenced using a local physical address 512 and may also be referenced using a global physical address 516. The local physical address 512 uses addresses 2000 and 2001, whereas the global physical address 516 uses addresses 7 and 8. In a typical replacement sequence, the data in the set of memory cells 504 of the failing memory block 500 are copied into the set of memory cells 514 of the replacement memory block 510. The local physical address 502 of the failing memory block 500, i.e., 1000 and 1001, is remapped to the local physical address 512, i.e., 1000 and 1001, of the replacement memory block 510. This remapping allows the rest of the system to remain unaltered during the replacement operation. When replacing partition units, it is preferable to perform "atomic" updates, i.e., replacements, of memory blocks. During an atomic update of a memory block, if the memory block being updated is accessed, either the addresses of the failing memory block are exclusively used or the addresses of the replacement memory block are exclusively used. That is, the data accesses for memory cells 504 are made exclusively from local physical address 502 or exclusively from local physical address 512.

The replacement of the failing memory block 500 with the replacement memory block 510 shown in FIG. 5 is one type of replacement that may occur when one partition unit is replaced by another partition unit. The replacement or addition of partition units may also involve the replacement or addition of one processor, set of cores, or core with another processor, set of cores, or core. A method for performing the replacement or addition of partition units in the process of, for example, performing a failover in a controlled and orderly fashion on partitionable servers, involves the management of spare partition units within partitions of local operating systems by a global management entity. An example of such a method is illustrated in functional flow diagram form in FIGS. 6-12. In the functional flow diagrams shown in FIGS. 6-12, except in blocks marked with "(G)," the actions are performed by a local operating system, i.e., an instance of an operating system controlling a partition. Blocks marked with a "(G)" contain actions performed by a global management entity such as an SP or BMC.

Figure 6:
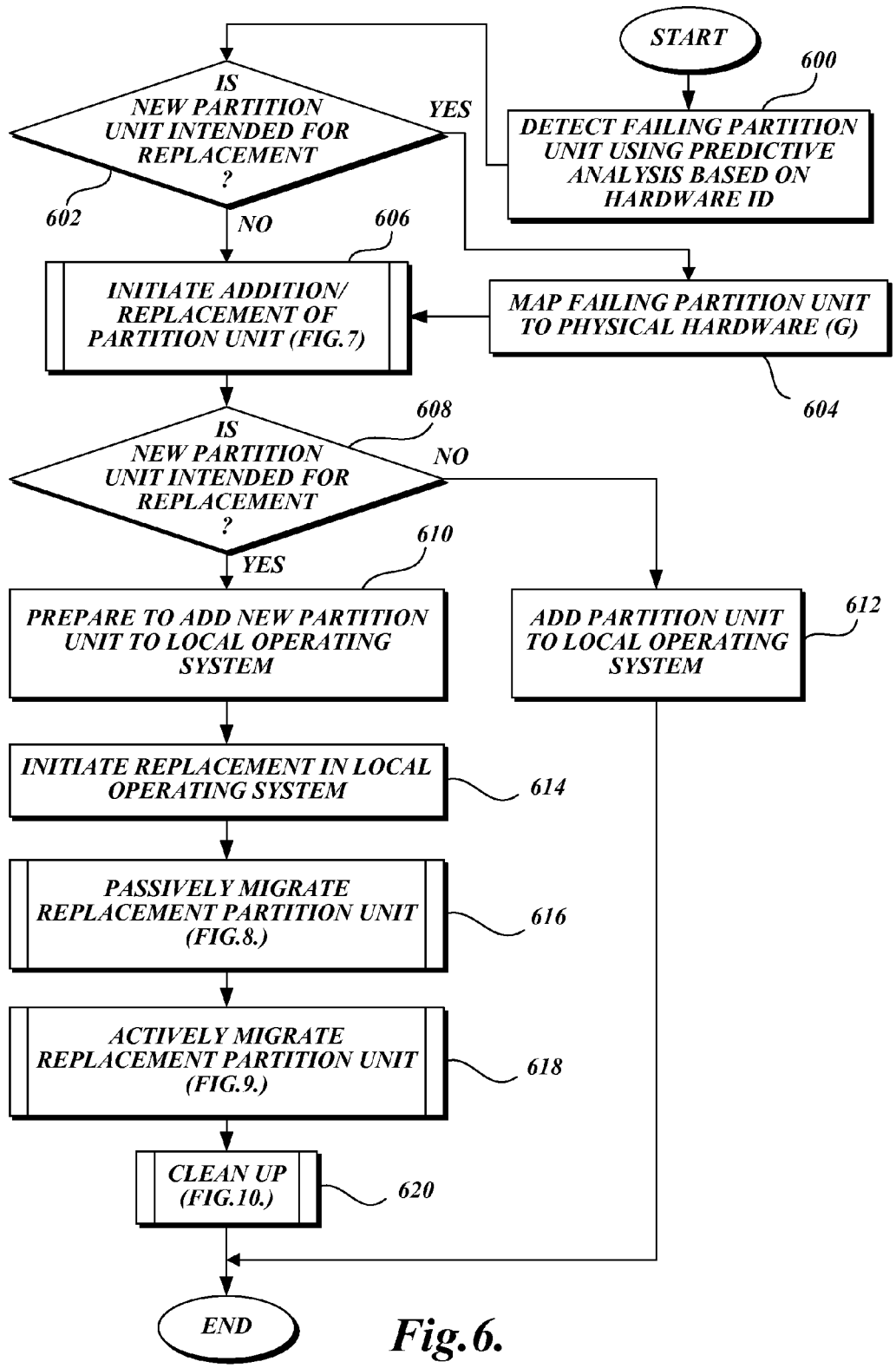
FIG. 6 is a functional flow diagram of an exemplary method for dynamically replacing a failing partition unit.

A functional flow diagram of an exemplary process for performing the replacement or addition of partition units is illustrated in FIG. 6.

Figure 7:
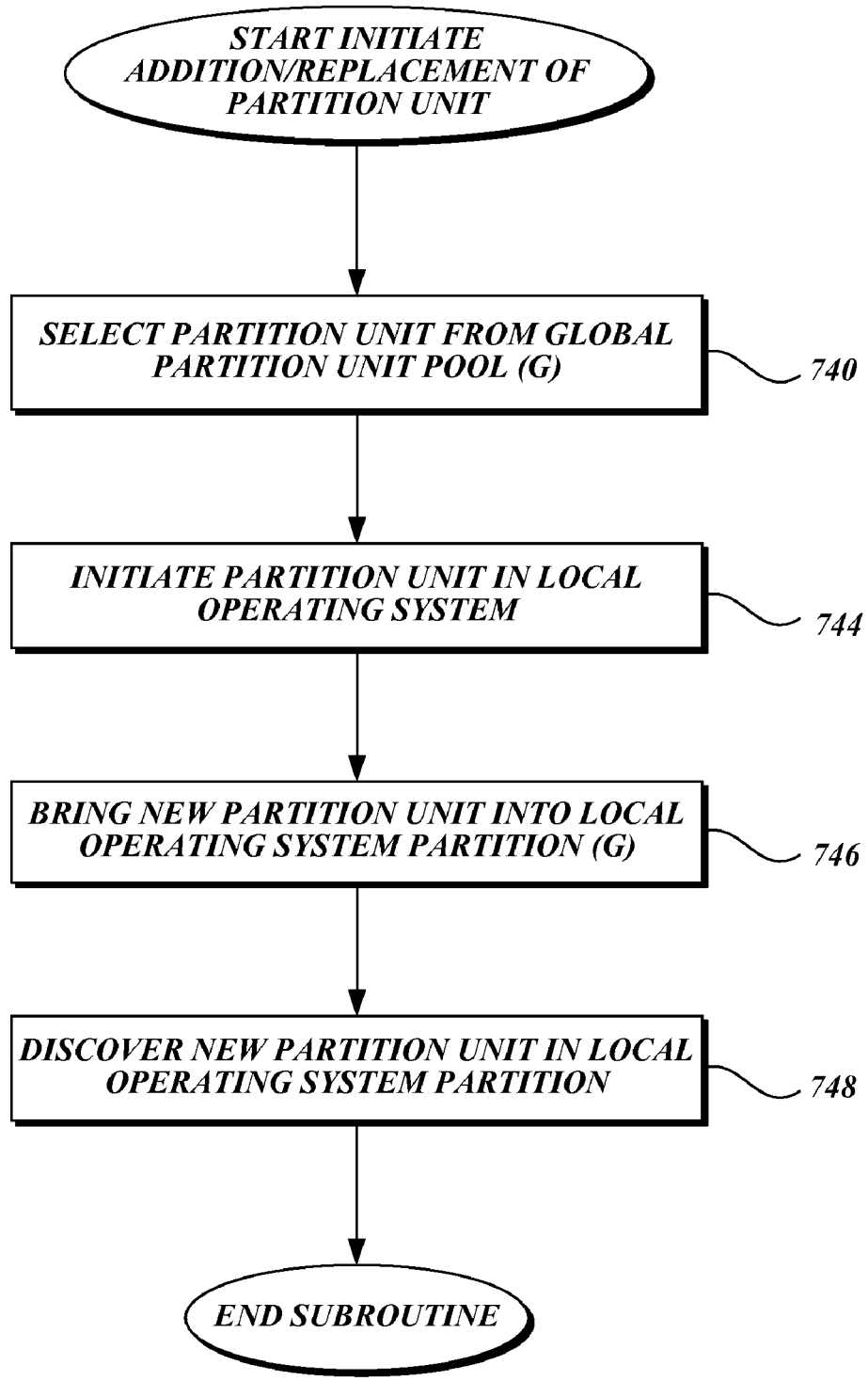
FIG. 7 is a functional flow diagram of an exemplary method for initiating the addition of a partition unit.
Figure 8:
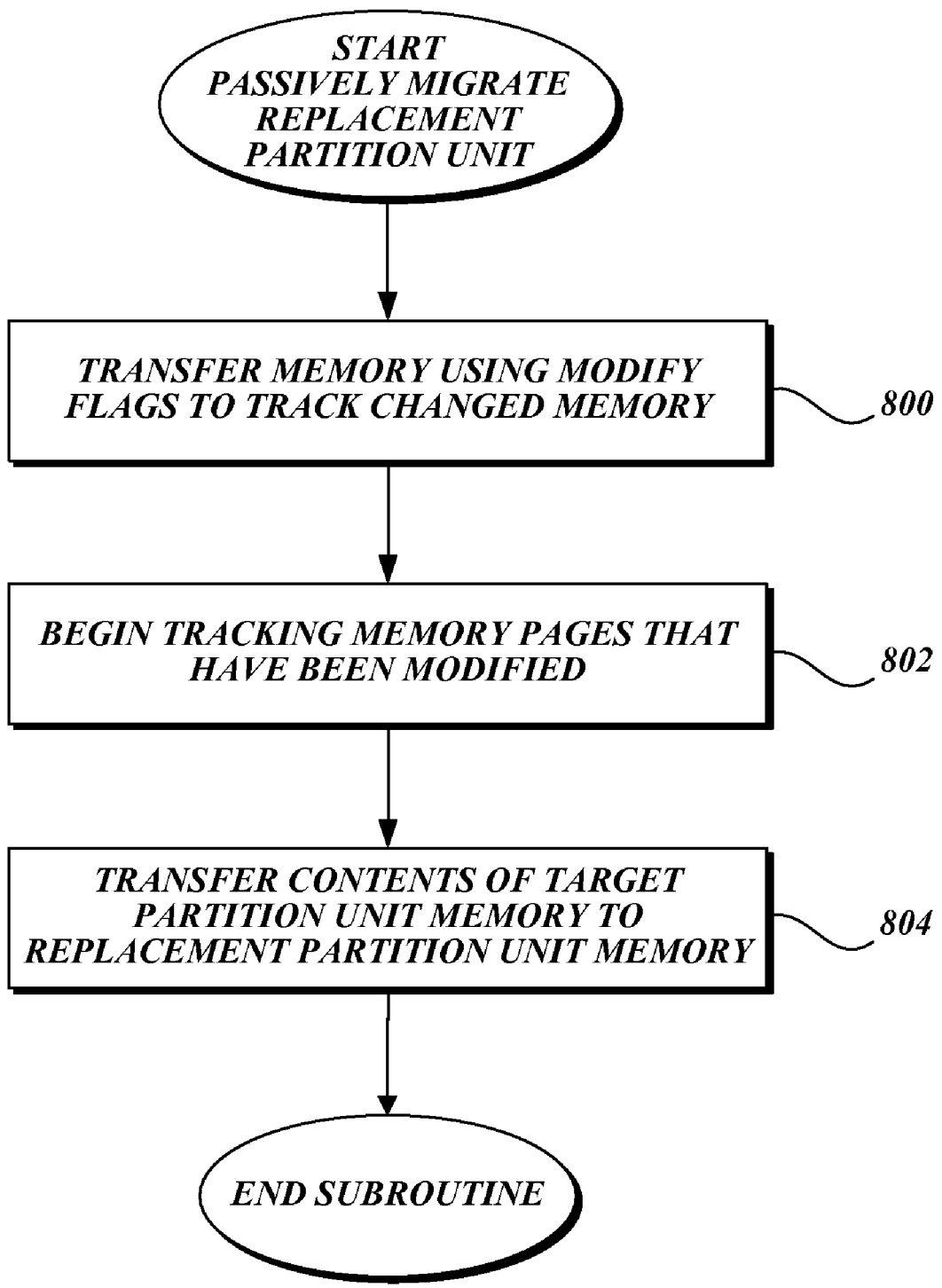
FIG. 8 is a functional flow diagram of an exemplary method for passively migrating a replacement partition unit.
Figure 9:
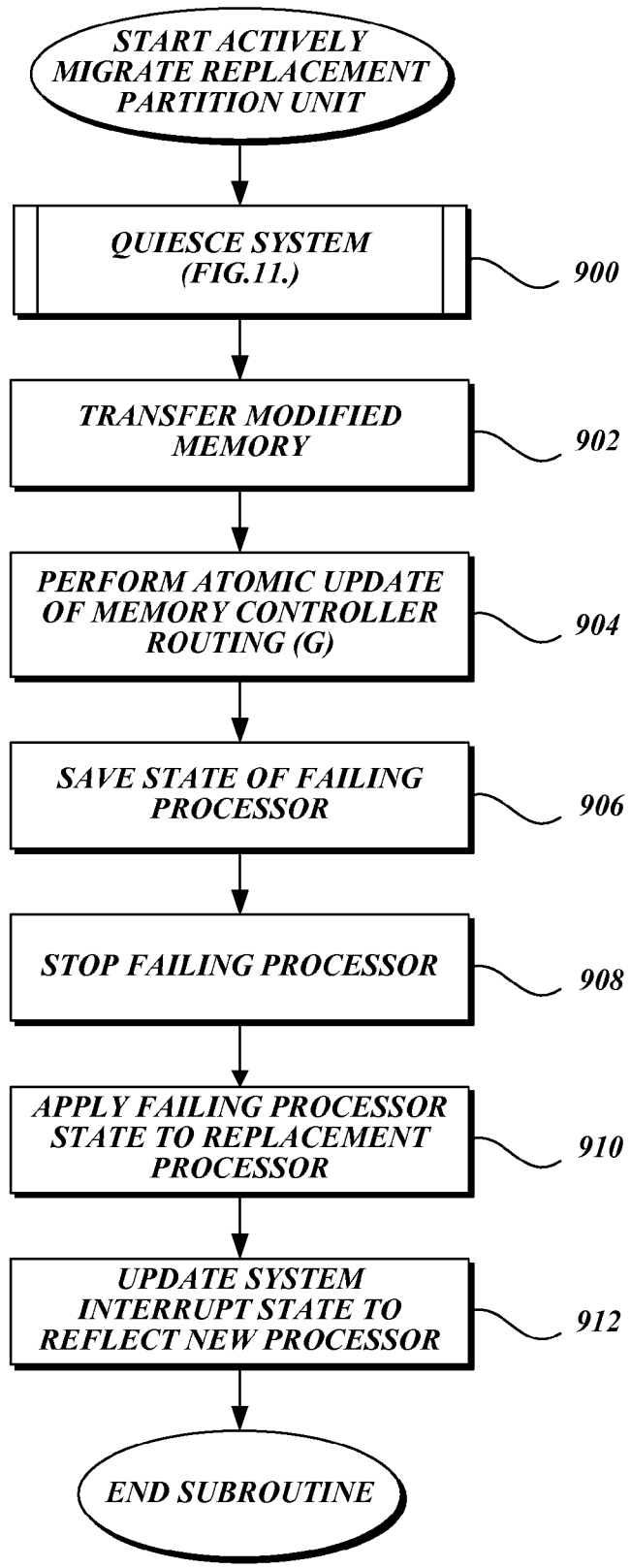
FIG. 9 is a functional flow diagram of an exemplary method for actively migrating a replacement partition unit.
Figure 10:
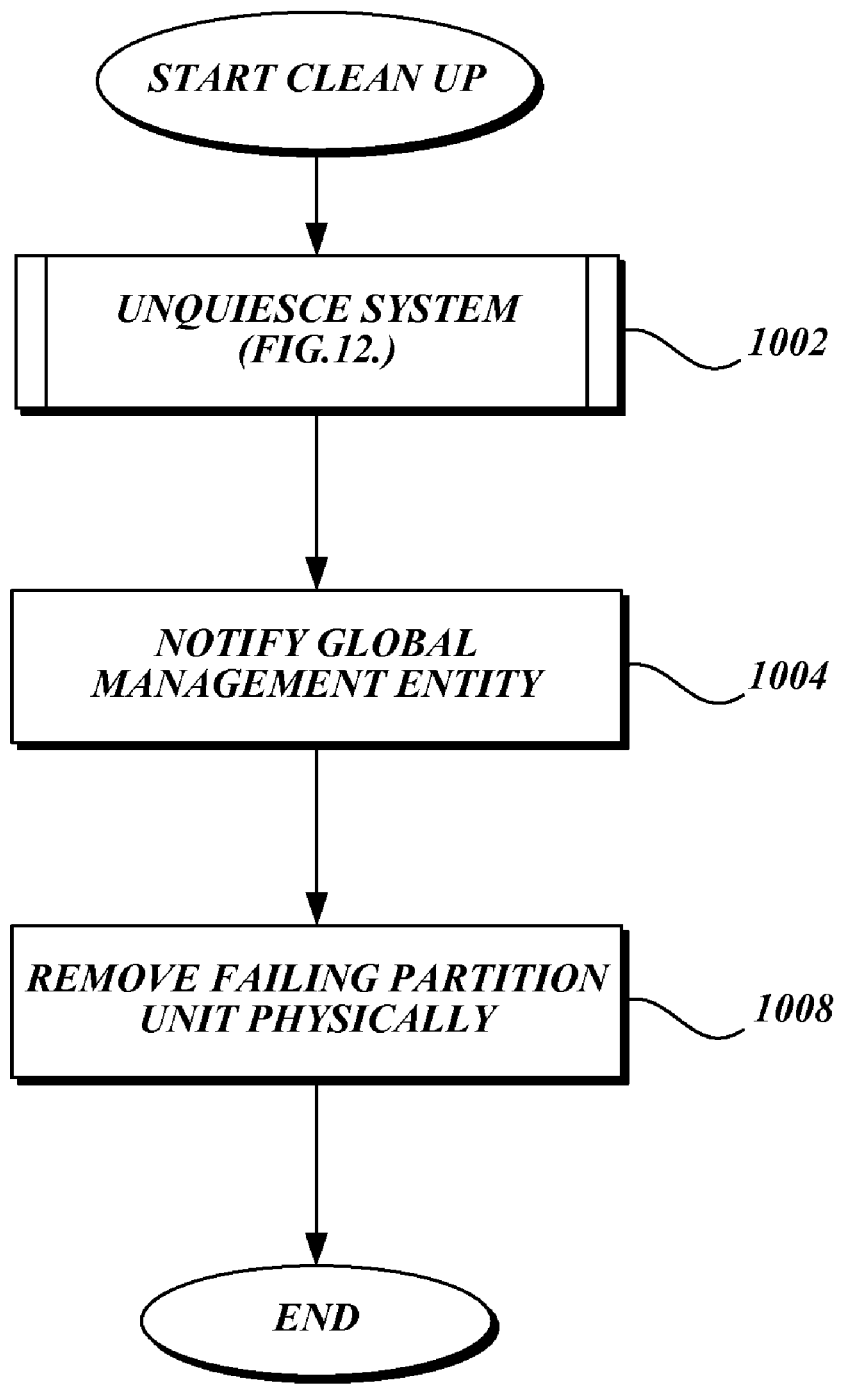
FIG. 10 is a functional flow diagram of an exemplary method for cleaning up after replacing a failing partition unit.

The method for performing the replacement or addition of partition units illustrated in FIG. 6 begins at block 600 in which the local operating system detects a failing partition unit using predictive analysis based on a hardware ID. A hardware ID may be, for example, the Advanced Programmable Interrupt Controller ID (APIC ID) of a processor. At decision block 602 a test is made to determine if a new partition unit is intended for replacement. If a new partition unit is intended for replacement, the control flows to block 604. If a new partition unit is not intended for replacement, i.e., is intended for addition, the control flows to subroutine 606. At block 604 the global management entity maps the failing partition unit to physical hardware. Control flows to subroutine 606, which is used to initiate the replacement of the partition unit. The details of initiating the addition or replacement of the partition unit are shown in FIG. 7 and described below. At decision block 608, once again, it is determined if a new partition unit is intended for replacement. If a new partition unit is not intended for replacement, i.e., is intended for addition, the control flows to block 612. At block 612, the local operating system adds the partition unit to the local operating system and then the method ends. If, at decision block 608, it is determined that a new partition is intended for replacement, control flows to block 610. At block 610 the local operating system prepares to add the new partition unit to the local operating system. For example, data structures may be set up in memory to record the APIC ID of the failing processor, to record the size and starting location of the failing memory block, or to remap the failing memory block into another memory block. At block 614 the local operating system initiates a replacement in the local operating system by sending a signal that indicates the installation of a replacement partition unit to the global management entity. After block 614, control flows to subroutine 616. Subroutine 616 is used to passively migrate the replacement partition unit. The details of passively migrating the replacement partition unit are shown in FIG. 8 and described below. After subroutine 616 is executed, control flows to subroutine 618. Subroutine 618 is used to actively migrate the replacement partition unit. The details of actively migrating the replacement partition unit are shown in FIG. 9 and described below. After subroutine 618 is executed, control flows to subroutine 620. Subroutine 620 is used to clean up after the replacement of the failing partition unit. Details of how a clean-up is performed are shown in FIG. 10 and described below. After subroutine 620 is executed, the method ends.

The details of subroutine 606, i.e., initiating the addition/replacement of the partition unit, are shown in FIG. 7. The subroutine begins at block 740, in which the global management entity selects a partition unit to be added from the global partition unit pool. The global partition unit pool is a set of partition units from which the global management entity selects replacement partition units. Using hardware partitioning, the global management entity selects which partition units are available to each local operating system. In the case of replacement, the global management entity selects a replacement partition unit that has at least the capabilities of the failing partition unit. An exemplary capability for a partition unit containing memory is the size of the memory. An exemplary capability for a partition unit containing a processor is number of cores in the processor. The replacement partition unit may be an idle spare or may be a partition unit being used by a different, perhaps less important, local operating system. The less critical local operating system may be shut down and the local operating system's resources, i.e., partition units, may then be used as spares. At block 744, the local operating system initiates the partition unit into the local operating system. At block 746, the global management entity brings the new partition unit into the local operating system partition. In particular, the SP 102 remaps the new partition unit in the routing table 106. At block 748, the local operating system discovers the new partition unit in the local operating system partition. After block 748, the subroutine ends.

The details of subroutine 616, i.e., passively migrate the replacement partition unit, are shown in exemplary form in the flow diagram illustrated in FIG. 8. The purpose of both passive and active migration is to transfer as much information from the failing partition unit to the replacement partition unit as possible without shutting down or disturbing ongoing high level applications. For example, an application may have mapped, i.e., requested and received, a plurality of memory blocks. It is possible that the application is not using, i.e., modifying, certain memory blocks in the plurality of memory blocks. As long as a memory block is not modified, the contents of the memory block may be transferred to a replacement memory block without disrupting the application. Another memory transfer strategy is to transfer as much state as possible and assume that most of the memory blocks will not be modified. One way to determine if a memory block has been modified is to check the modify flags of the virtual memory page table entries for each of the pages of physical memory of the memory block. If a modify flag has not been set, the memory block has not been modified and is therefore in a transferable state. Certain methods of transferring memory contents are more efficient than other methods. For example, a processor must transfer the contents of a memory cell into a register or cell in the processor and then to the new memory cell. Typically, processors are limited to the largest data transfer width of the registers, e.g., 64 bits. Specialized memory transfer devices, such as a direct memory access (DMA) processor, can transfer blocks of memory in larger "chunks" and usually more quickly. A "background engine," such as a DMA processor, requires little or no intervention by a processor to transfer the contents of memory blocks. Preferably, a driver model enables the modify flag checking and contents transfer to be done in an optimal manner.

The exemplary flow diagram of the subroutine for passively migrate the replacement partition unit is illustrated in FIG. 8. The subroutine begins at block 800 in which memory is transferred using modify flags to track changed memory. At block 802, the local operating system begins tracking memory pages, i.e., blocks, that have been modified by checking the modify flags of the blocks. At block 804, the contents of the target, i.e., failing, partition unit memory, are transferred to the replacement partition unit memory.

Figure 11:
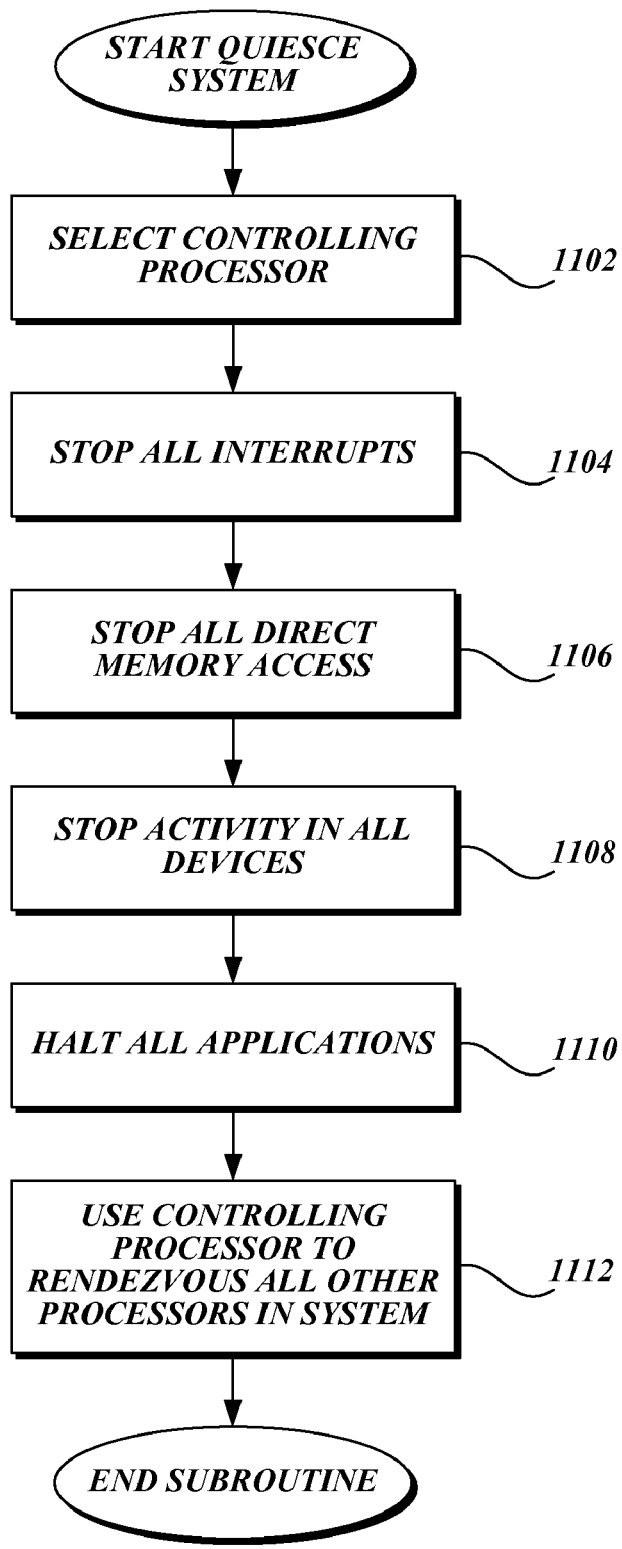
FIG. 11 is a functional flow diagram of an exemplary method for quiescing a system.

Note that while the actions in the blocks shown in FIGS. 6 through 8 are being performed, high level applications operating in the local operating system are still able to do useful work even as the local operating system prepares to replace a failing partition unit. This is not the case for the actions performed in subroutine 618, i.e., actively migrate replacement partition unit. Instead, the process can be said to be entering a "critical section" in which no activity is permitted except for actions necessary to complete the replacement. This critical section of the process, active migration of a replacement partition unit, is illustrated in the exemplary functional flow diagram in FIG. 9. Preferably, the time spent in the critical section is minimized to avoid a remote connection to an application running on the local operating system from perceiving the active migration. The subroutine begins at subroutine 900 where the local operating system "quiesces" the system. Details of quiescing a system are illustrated in FIG. 11 and described below. Briefly, when a system is quiesced, interrupts are stopped to keep I/O devices and other processors from interrupting the processor being replaced and memory modification is stopped. Continuing in FIG. 9 at block 902, the local operating system transfers modified memory, i.e., transfers the contents of memory blocks with the modified flag set. At block 904, the global management entity performs an atomic update of memory controller routing. At block 906, the local operating system saves the state of the failing processor. At block 908, the local operating system stops the failing processor. The failing processor is still in the partition and is turned off to ensure the failing processor can do no harm while still in the partition. At block 910 the local operating system applies the failing processor state to the replacement processor. Applying a failing processor state to a replacement processor may include transferring the internally and externally accessible registers of the failing processor to the replacement processor; atomically changing the APIC ID of the replacement processor to the APIC ID of the failing processor; and changing the interrupt descriptor table so that the interrupts that would be triggered on the failing processor are triggered on the replacement processor. At block 912, the local operating system updates the system interrupt state to reflect the new, i.e., replacement, processor. That is, the global interrupt state is modified to cause external devices to access the replacement processor instead of the failing processor. After block 912, the active migration of a replacement partition unit subroutine of the process ends.

Figure 12:
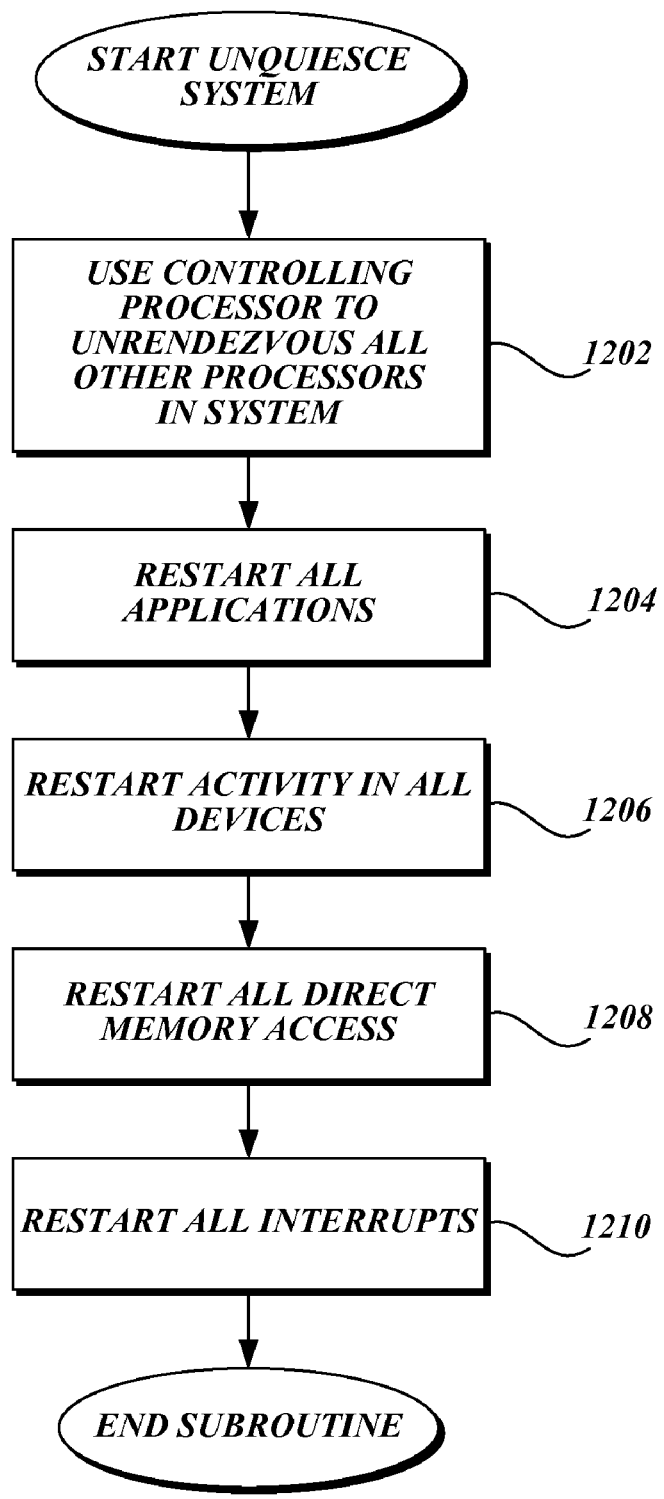
FIG. 12 is a functional flow diagram of an exemplary method for unquiescing a system.

The details of subroutine 620 shown in FIG. 6, i.e., clean up, are shown in the exemplary flow diagram illustrated in FIG. 10. The clean up subroutine begins at subroutine 1002 in which the system is unquiesced. The details of unquiescing a system are shown in FIG. 12 and described below. At block 1004 in FIG. 10, the global management entity, e.g., SP 102 shown in FIG. 1, is notified that quiescing is ended. At block 1008, the failing partition unit is physically removed. Removing a failing partition unit may involve mechanically removing various physical devices or may involve electrically isolating various physical devices. If, for instance, a processor is plugged into an electrically connected socket, the processor may be "physically removed" by either shutting down power to the socket in which the processor is plugged or by removing the processor from the socket. After block 1008, the subroutine ends.

While the activity in block 1008, removing the physical devices of a failing partition unit, may be viewed as optional, it is preferable. A failing physical device is still entered in the routing tables of the partition unit. Hence, under certain circumstances, the failing physical device may perturb other components in the system.

The details of subroutine 900, shown in FIG. 9, i.e., quiesce system, are shown in the exemplary flow diagram illustrated in FIG. 11. The term "quiesce" means to place the system in a state of inactivity. Quiescing a system provides a safe environment for atomic replacements. At block 1102 shown in FIG. 11, the local operating system selects a controlling processor, i.e., the processor that will control the quiescing activities. The controlling processor executes a set of instructions that accomplish system quiescing and active migration. There are various algorithms for choosing a controlling processor. For example, the least busy processor with the lowest number that is not being replaced may be selected to be the controlling processor. Another controlling processor candidate may be the processor that started the replacement process. It is also possible, but usually not optimal, to have multiple controlling processors. Hence, a single controlling processor should be construed as exemplary and not limiting.

The controlling processor carries out the remaining actions in the quiescing subroutine. At block 1104, the controlling processor stops all interrupts, i.e., stops physical devices from interrupting the processor that needs to be replaced. Preferably, physical devices are quiesced. The controlling processor communicates with the device drivers that control the physical devices. To prevent the physical devices from triggering interrupts, the controlling processor may send a stop, sleep, or suspend signal to the device drivers. The same signals may be used to prevent memory accesses. Preferably the system is able to be quiesced without the device drivers having to be modified and/or recompiled. At block 1106, the controlling processor stops all direct memory access. The device drivers are prevented from writing to files and performing DMA. The device drivers may queue requests for interrupts and DMA. There are edge triggered and level triggered interrupts. Level triggered interrupts may be queued. If an edge triggered interrupt is not immediately serviced, the interrupt is lost.

Continuing with FIG. 11, at block 1108 the controlling processor stops activity in all devices. Preferably, the devices avoid modifying the memory that is being used by the processor that is being replaced and avoid modifying the state of the processor that is being replaced. Processor state includes registers and memory in the processor itself and memory external to the processor that is allocated exclusively for storing processor state. Broadly speaking, communication with the partition unit that is going to be replaced is stopped. At block 1110, the controlling processor halts all applications by sending a signal to the applications indicating that a pause in operation is occurring. At block 1112, the controlling processor is used to "rendezvous" all other processors in the system. In a rendezvous, the controlling processor causes the other processors to stop accessing the partition unit that is being replaced, i.e., the failing partition unit. After block 1112, the subroutine ends. If there are partition units that need to be added, as opposed to replacing other partition units, the additional partition units may be added after the quiescing subroutine.

In a rendezvous, also known as corralling, the controlling processor causes the other processors to stop accessing the partition unit that is being replaced by sending an interprocessor interrupt (IPI) command to the other processors. The IPI indicates to the other processors that the other processors should be spinning on a common barrier. That is, stop doing application work and spin on the barrier until the barrier changes to indicate that application work should restart. Having the processors, which are running applications, spin on a barrier prevents the applications from interfering with the replacement without the applications having to explicitly halt. Preferably, the applications are given an opportunity to respond to the existence of a pause in a way consistent with the application's purpose. Even if an application does not respond to the existence of a pause, when the processor running the application is rendezvoused, the application is automatically prevented from interfering with the replacement.

In an exemplary instance of spinning on a barrier, each processor executes the same set of instructions to ensure that the processors are not executing other instructions. The instructions instruct the processors to read an address; if the contents at the address are not zero, then read the address again. When the controlling processor sets the contents of the address to zero, the processors step past the instruction set and go back to what the processors were doing before spinning on the barrier. While the processors are spinning on the barrier, the controller processor is able to transfer the state that was unable to be transferred in the passive migration state and is able to transfer modified memory.

In a typical rendezvous, there may be multiple stages each requiring a barrier. For example, in a first stage, the controlling processor sets a first barrier for the other, i.e., non-controlling, processors. While the other processors spin on the barrier, the controlling processor executes code to set up data structures in which to save state. The controlling processor then releases the first barrier and instructs the other processors to save state. The controlling processor sets a second barrier for a second stage. When the other processors have followed the instructions to save state, the other processors spin on the second barrier. At an appropriate time, e.g., when all other processors have saved state, the controlling processor releases the second barrier and instructs the other processors to go offline.

The details of subroutine 1002 shown in FIG. 10, i.e., unquiesce system, are shown in the exemplary flow diagram illustrated in FIG. 12. Unquiescing a system is basically the inverse of quiescing a system. Unquiescing begins at block 1202 in which the controlling processor is used to unrendezvous, i.e., release, all other processors in the system. At block 1204, all applications are restarted. More specifically, the processors are available to schedule activity from the applications as the process is transparent to the applications themselves. At block 1206, activity is restarted in all devices. At block 1208, all direct memory access is restarted. At block 1210, all interrupts are restarted. After block 1210, the subroutine ends.

The process illustrated in FIGS. 6-12 and described above allows a local operating system to be able to replace partition units without having to be recompiled for particular devices. The process may be implemented to run on most computer manufacturers' equipment if the equipment supports partitions and partition units. Firmware may be written with sufficient software "hooks" to allow the details for specific hardware to be abstracted out thus avoiding the effort and expense of writing firmware for each specific piece of equipment. Firmware may be required but the implementation of the process in local operating system need not be recompiled, repackaged, or redistributed.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of managing spare partition units in a partitionable computing device by a global management entity, the method comprising:
   determining whether a spare partition unit is required for replacement of a failing partition unit in a partition among a plurality of partitions of the partitionable computing device, the failing partition unit having a plurality of first memory blocks and a first processor; and
   when it is determined that a spare partition unit is required for replacement of the failing partition unit:
   (a) initiating replacement of the failing partition unit, the initiating comprising selecting the spare partition unit from a pool of spare partition units to replace the failing partition unit, the spare partition unit comprising a plurality of second memory blocks and a second processor;
   (b) passively migrating first data, the passive migration comprising transferring the first data from unmodified first memory blocks of the failing partition unit to memory blocks among the plurality of second memory blocks of the spare partition unit;
   (c) actively migrating second data by transferring the second data from modified first memory blocks of the failing partition unit to memory blocks among the plurality of second memory blocks of the spare partition unit while the partitionable computing device is quiesced;
   (d) transferring a state of the first processor of the failing partition unit to the second processor of the spare partition unit while the partitionable computing device is quiesced; and
   (e) cleaning up the partitionable computing device, the clean up comprising unquiescing the partitionable computing device.

2. The method of claim 1, further comprising:
   determining whether a spare partition unit is required for addition to the partition;
   when it is determined that a spare partition unit is require for addition, initiating an addition of a spare partition unit, the initiating comprising:
   (a) the global management entity selecting the spare partition unit to be added from the pool of spare partition units;
   (b) the global management entity initiating the selected spare partition unit into the global management entity;
   (c) the local operating system initiating the selected spare partition unit into the partition;
   (d) the global management entity bringing the selected spare partition unit into the partition; and
   (e) when the local operating system discovers the selected spare partition unit in the partition, the local operating system adds the selected spare partition unit to the partition.

3. The method of claim 1, wherein initiating a replacement of the failing partition unit comprises:
   (a) when a failing partition unit is detected, the global management entity mapping the failing partition unit to a physical hardware device;
   (b) the global management entity selecting a spare replacement partition unit from a global pool;
   (c) the global management entity initiating the spare partition unit to the global management entity;
   (d) the local operating system initiating the spare partition unit into the local operating system;
   (e) the global management entity bringing the spare partition unit into the partition; and (f) when the local operating system discovers the spare partition unit in the partition, the local operating system preparing to add in the spare partition unit to the partition.

4. The method of claim 3, wherein the detection that a partition unit is failing is determined by predictive analysis based on the hardware ID of the partition unit.

5. The method of claim 1, wherein passively migrating comprises:
   (a) identifying the unmodified first memory blocks of the failing partition unit using modified flags; and
   (b) the global management entity performing an atomic update of a memory control routing table.

6. The method of claim 1, wherein actively migrating comprises:
   (a) the global management entity quiescing the partitionable computing device;
   (b) identifying the modified first memory blocks of the failing partition unit using modified flags;
   (c) the global management entity performing an atomic update of a memory controller routing table;
   (d) the local operating system changing a system interrupt state of the local operating system; and
   (e) the local operating system stopping the failing partition unit's first processor.

7. The method of claim 6, wherein cleaning up the partitionable server comprises:
   (a) the global management entity unquiescing the partitionable computing device;
   (b) the local operating system notifying the global management entity of the replacement; and
   (c) removing the failing partitioning unit's first processor logically.

8. The method of claim 7, also including removing the failing partition unit's first processor physically.

9. The method of claim 8, wherein physically removing the failing partition unit's first processor physically is done by the local operating system electrically isolating the failing partition unit's first processor.

10. The method of claim 1, wherein the failing partition units are replaced without recompiling computer-executable instructions.

11. A computer-readable storage medium containing computer executable instructions for managing spare partition units in a partitionable computing device comprising a global management entity and a plurality of partitions, each partition executing an instance of a local operating system, the computer executable instructions, when executed, causing the global management entity and a local operating system of a first partition to:
   (a) determine whether a spare partition unit having a first memory unit and a first processor is required for addition or replacement in the first partition of the partitionable computing device;
   (b) when it is determined that a spare partition unit is required for addition, initiate an addition of a spare partition unit to the partition; and
   (c) when it is determined that a spare partition unit is required for replacement:
   (i) initiate replacement of a partition unit to be replaced in the first partition with a spare partition unit, the partition unit to be replaced having a second memory unit and a second processor;
   (ii) transferring data from the second memory unit of the partition unit to be replaced to the first memory unit of the spare partition unit;
   (iii) transferring a state of the second processor of the partition unit to be replaced to the first processor of the spare partition unit; and
   (iv) clean-up the partitionable computing device, wherein the clean up comprising unquiescing the partitionable computing device;
   wherein transferring data from the second memory unit of the partition unit to be replaced to the first memory unit of the spare partition unit comprises:
   passively migrating an unchanged portion of the data, the passive migration comprising transferring the unchanged portion of the data from memory blocks in the second memory unit having a modified flag indicating the memory block is unchanged;
   quiescing the partitionable computing device;
   transferring the changed portions of the data while the partitionable computing device is quiesced;
   transferring the state of the second processor of the partition unit to be replaced to the first processor of the spare partition unit while the partitionable computing device is quiesced; and
   performing an atomic update of a memory controller routing table.

12. The computer-readable storage medium of claim 11, wherein initiate an addition of a spare partition unit to the partition comprises:
   (a) selecting the spare partition unit to be added from a pool;
   (b) initiating the selected spare partition unit into the global management entity;
   (c) initiating the addition of the selected spare partition unit into the partition;
   (d) bringing the selected spare partition unit into the partition; and (e) adding the selected spare partition unit to the partition.

13. The computer-readable storage medium of claim 11, wherein initiate replacement of a partition unit to be replaced with a spare partition unit comprises:
   (a) detecting a failing partition unit;
   (b) selecting a replacement partition unit from a pool;
   (c) initiating a replacement of the failing partition unit in the global management entity;
   (d) initiating a replacement of the failing partition unit into the local operating system;
   (e) bringing the spare partition unit into the partition in the local operating system; and
   (f) preparing to add the spare partition unit into the partition.

14. The computer-readable storage medium of claim 13, detecting a failing partition unit is determined using predictive analysis.

15. The computer-readable storage medium of claim 11, wherein transferring data from the second memory unit of the partition unit to be replaced to the first memory unit of the spare partition unit and transferring a state of the second processor of the partition unit to be replaced to the first processor of the spare partition unit comprises:
   (a) changing a system interrupt state of the local operating system; and
   (b) stopping the second processor.

16. The computer-readable storage medium of claim 15, wherein cleaning up the partitionable server comprises:
   (a) notifying the global management entity of the replacement;
   (b) removing the second processor logically; and
   (c) removing the second processor physically.

17. The computer-readable storage medium of claim 16, wherein removing the second processor physically is done by electrically isolating the second processor.

18. The computer-readable storage medium of claim 16, wherein removing the second processor physically is done by removing the second processor from the second processor's socket.

19. The computer-readable storage medium of claim 11, wherein the partition unit to be replaced is replaced without computer-executable instructions recompiling.

* * * * *